(12) United States Patent
Nelson

(10) Patent No.: US 6,660,929 B2
(45) Date of Patent: Dec. 9, 2003

(54) ELECTRICAL POWER MODULE AND SYSTEM

(76) Inventor: Louis Nelson, 300 Lawrence St., Uniondale, NY (US) 11553

( * ) Notice: Subject to any disclaimer, the term of this patent is extended or adjusted under 35 U.S.C. 154(b) by 1 day.

(21) Appl. No.: 10/052,025

(22) Filed: Jan. 17, 2002

(65) Prior Publication Data

US 2003/0131879 A1 Jul. 17, 2003

(51) Int. Cl.$^7$ .............................................. H01L 31/048
(52) U.S. Cl. ...................... 136/251; 136/290; 136/293; 323/906; 323/221; 257/433
(58) Field of Search ................. 136/251, 290, 136/293; 323/906, 221; 257/433

(56) References Cited

U.S. PATENT DOCUMENTS

| | | | | | |
|---|---|---|---|---|---|
| 3,617,820 | A | * | 11/1971 | Herzog | 257/86 |
| 3,751,162 | A | * | 8/1973 | Long | 356/30 |
| 4,509,012 | A | * | 4/1985 | Lin | 324/767 |
| 4,677,304 | A | * | 6/1987 | Camp et al. | 250/577 |

* cited by examiner

*Primary Examiner*—Alan Diamond
(74) *Attorney, Agent, or Firm*—Kirschstein, et al.

(57) ABSTRACT

Light sources are mounted within a light-proof enclosure in which photovoltaic panels are mounted to produce electrical power irrespective of weather conditions outside the enclosure.

10 Claims, 2 Drawing Sheets

US 6,660,929 B2

ELECTRICAL POWER MODULE AND SYSTEM

BACKGROUND OF THE INVENTION

1. Field of the Invention

The present invention generally relates to the generation of electrical power, particularly by using photovoltaic cells to power electrical systems.

2. Description of the Related Art

Photovoltaic or solar cells are operative to convert light directly into electricity, and are commonly used on calculators as replacements for batteries. Solar cells are also configured in the form of panels and positioned on a roof of a house to receive the sun's energy. Such solar-powered residential systems, however, require the correct orientation relative to the sun, different orientations during the day and for different seasons, and storage batteries to store power for subsequent use during the night or on cloudy days.

SUMMARY OF THE INVENTION

Objects of the Invention

Accordingly, it is a general object of this invention to provide electrical power using photovoltaic cells in an environment not subject to weather conditions.

FEATURES OF THE INVENTION

In keeping with the above object and others which will become apparent hereafter, one feature of the present invention resides in an electrical power module that comprises a light-proof enclosure, at least one electrically energized light source and preferably a plurality of light sources mounted within the enclosure for emitting light, and at least one photovoltaic panel and preferably a plurality of photovoltaic panels mounted within the enclosure for converting the light emitted by each source to electrical power.

In a preferred embodiment, the panels are mounted at interior surfaces of walls of the enclosure. Also, one or more light reflectors are mounted on the walls.

A control circuit is operative for energizing each light source. The control circuit preferably includes a relay switchable between states in which an external power source, such as a battery, is operatively connected to, or disconnected from, each light source. An inverter is also employed to convert DC voltage supplied by the battery to AC voltage.

The enclosure, itself, is a closed box. The light sources allow the continuous production of electricity irrespective of weather conditions outside the box.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
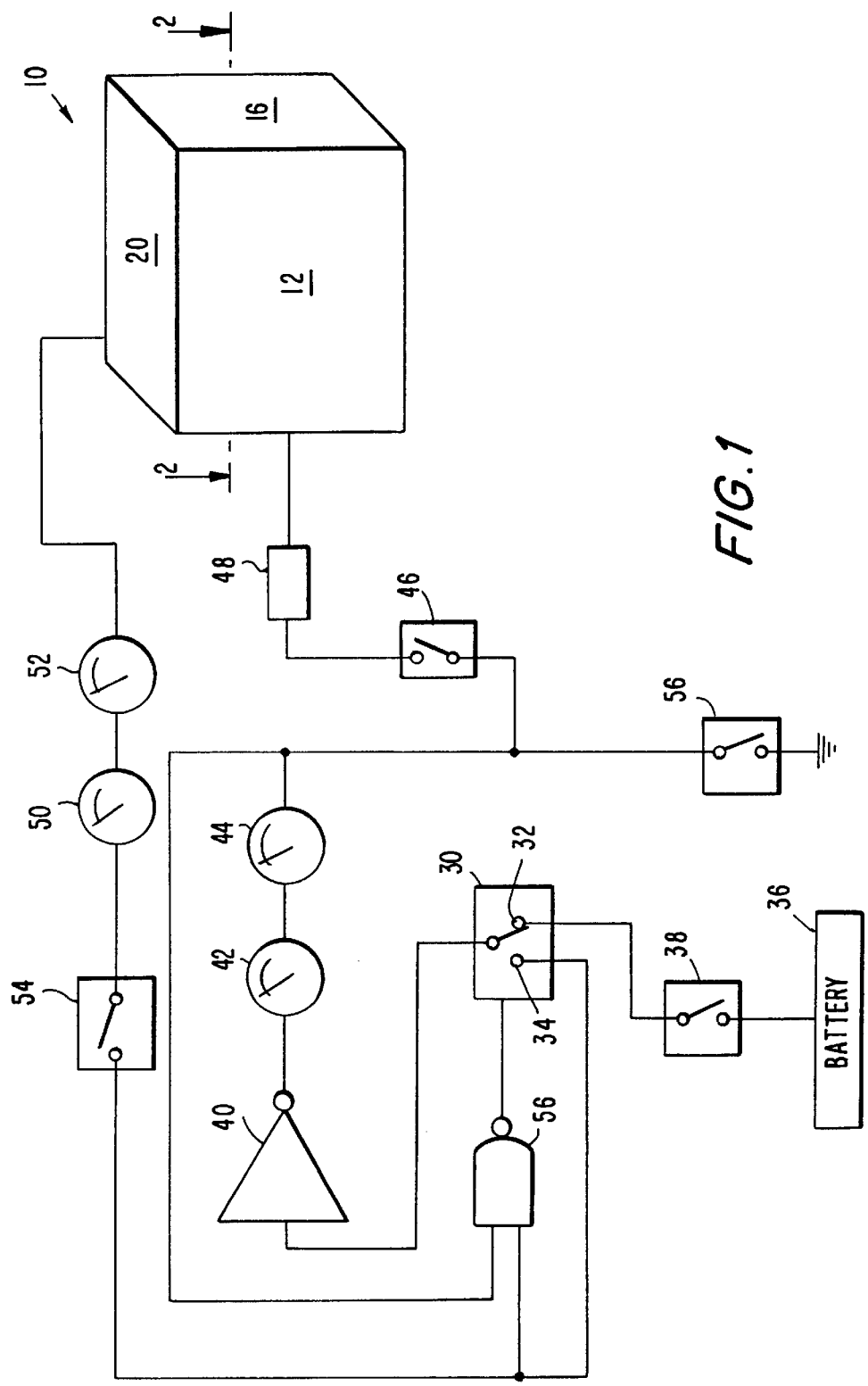
FIG. 1 is a circuit diagram of an electrical power system employing a power module in accordance with this invention.

Reference numeral 10 in FIGS. 1–4 generally identifies a light-proof enclosure having front 12 and rear 14 walls, a pair of end walls 16, 18, and top 20 and bottom 22 walls, all of the walls bounding an interior compartment. The walls are opaque.

At least one lamp 24, and preferably a plurality of such lamps 24, is mounted within the compartment. Each lamp is operative, when electrically energized, preferably by an AC voltage, to emit light. High-energy photon lamps, quartz tungsten halogen lamps, fluorescent lamps, light emitting diodes, and flash simulators are examples of the type of lamp that can be employed.

At least one photovoltaic panel 26, and preferably a plurality of photovoltaic panels 26, is mounted on interior surfaces of the enclosure walls. As shown, the panels 26 are mounted on the front, rear and end walls. Each photovoltaic panel 26 is constituted of solar cells made of a semiconductor material such as silicon, which is currently the most commonly used. Basically, when light strikes a solar cell, a certain portion of the light is absorbed within, and transferred to, the semiconductor material. The energy knocks electrons loose, allowing them to flow freely. One or more electrical fields act to force the electrons freed by light absorption to flow in a certain direction. This flow of electrons is a current which is drawn off for external use by conductive contacts on the cell. The process of converting light energy to electrical energy in a solid-state photovoltaic cell is self-contained. There are no moving parts and no materials are consumed or emitted.

A suitable panel is available from Siemens G.m.b.H. as its Model No. SM110, and is rated for 12/24 v operation, 110 w of power, and generates an output voltage of 17.5/35 v and an output current of 6.3/3.15 amperes, and is rectangular in shape with dimensions of 51.8"×26". One or more such panels can be mounted on an enclosure wall.

Referring now to FIG. 1, a control circuit for electrically energizing the lamps 24 includes a relay 30 switchable from the illustrated normally closed contact 32 in an initializing mode of operation, to the normally open contact 34 in a steady state of operation. By way of non-limiting, numerical example, the operation of the power system will be described for a 400 watts system, utilizing a stack of six panels each operative for generating about 80 watts. Two panels are mounted on each of the front and rear walls. One panel is mounted on each end wall. The panels are electrically connected in parallel and produce a total of about 37.8 amperes at about 12 v DC.

In the initializing mode, a pre-charged battery 36 capable of delivering about 60 ampere-hours at 12 v DC is connected to switch 38 which is manually closed to deliver its current to the normally closed contact 32 and to an inverter 40 operative for converting DC current to AC current. The inverter requires about 33.3 amperes at 12 v DC at its input to produce 3.33 amperes at 120 v AC, or about 400 watts.

A voltmeter 42 and ammeter 44 at the inverter output verify proper operation, after which switch 46 is closed to deliver the output current to a ballast 48 and, in turn, to each of the lamps 24 within the enclosure 10.

The light emitted by the lamps causes the panels to produce electricity and, in this example, about 6.3 amperes per panel for a total of about 37.8 amperes at 12 v DC. A voltmeter 50 and ammeter 52 at the output of the panels verify system operation, after which switch 54 is closed to deliver the output current of the panels to the normally open contact 34 and to one input of a sensor 56. The other input of the sensor 56 is connected to the inverter output.

Once the sensor 56 detects power at both of its inputs, the sensor 56 triggers the relay 30 to switch from contact 32 to contact 34, thereby disconnecting the battery 36 and also transferring the output current from the panels to the inverter 40. The switch 38 can be opened. An output switch 56 is closed to convey a portion of the output current to a load for electrical power consumption.

Figure 2:
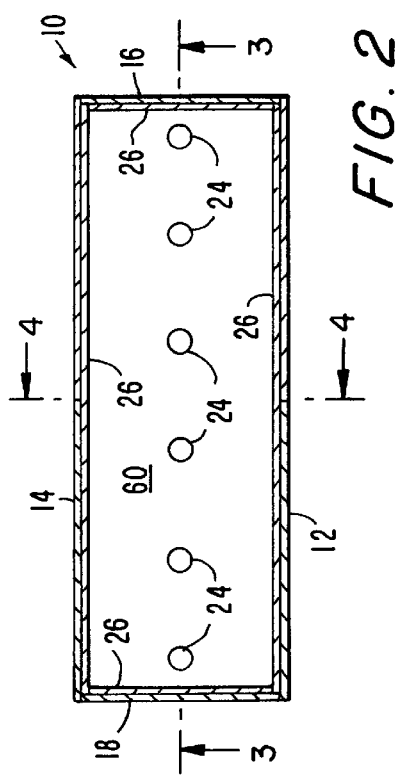
FIG. 2 is a sectional view taken on line 2—2 of FIG. 1.
Figure 4:
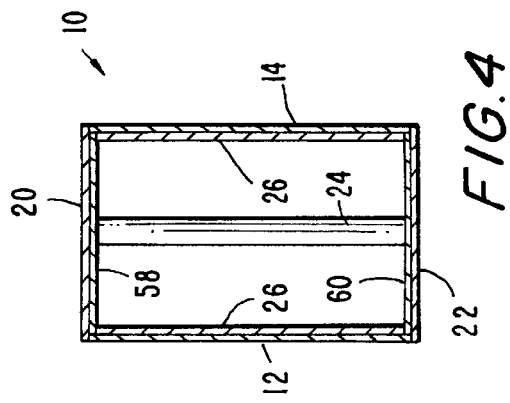
FIG. 4 is a sectional view taken on line 4—4 of FIG. 2.
Figure 3:
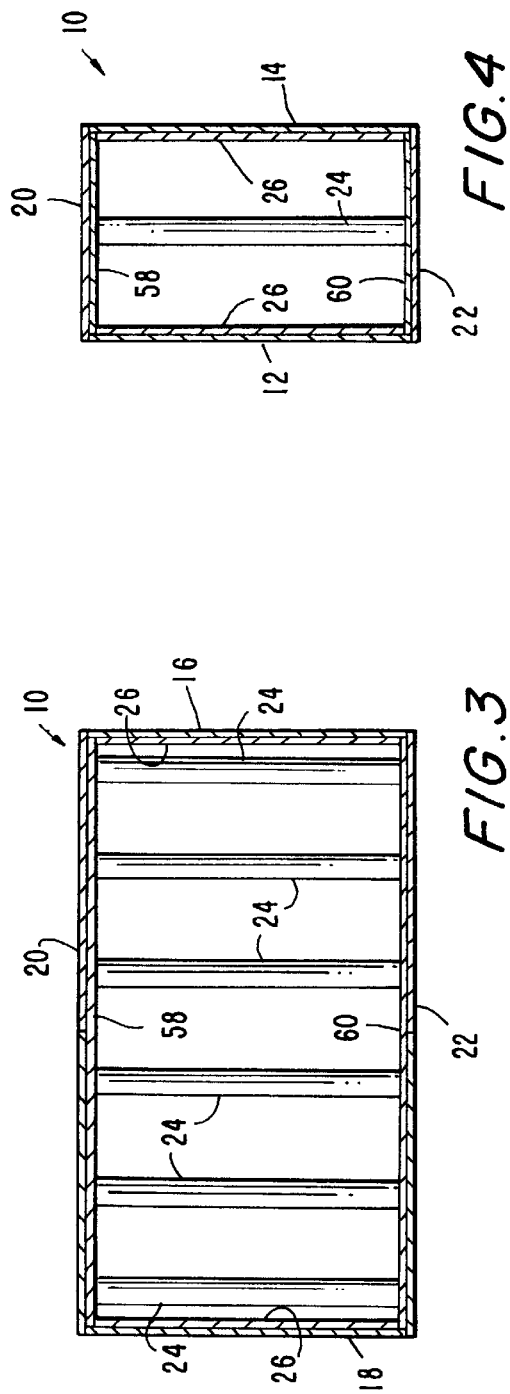
FIG. 3 is a sectional view taken on line 3—3 of FIG. 2.

As shown in FIGS. 2–3, six lamps 24 are arranged in the enclosure in a spaced-apart relationship in order to uniformly illuminate the panels. The lamps need not be linear as shown, but can be point sources, or configured in two-dimensional shapes such as a U-shape for increased area coverage. Reflectors 58, 60 are mounted within the enclosure, for example, on the interior surfaces of the top and bottom walls, for reflecting the light emitted by the lamps uniformly toward the panels. The reflectors may be flat mirrors, or prisms, or a specular film, such as a metal foil.

The enclosure is preferably formed with an access door for replacement, maintenance and repair of the lamps and panels therein. The door has seals to prevent light from escaping when the door is closed.

It will be understood that each of the elements described above, or two or more together, also may find a useful application in other types of constructions differing from the types described above.

While the invention has been illustrated and described as embodied in an electrical power module and system, is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An electrical power module, comprising:

a) a light-proof enclosure;

b) an electrically energizable light source within the enclosure, for emitting light when energized;

c) a photovoltaic panel within the enclosure, for converting the light emitted by the light source to electrical power; and d) an additional light source within the enclosure, for emitting additional light when energized.

2. The module of claim 1, wherein the enclosure has generally planar walls, and wherein the panel is mounted on an interior surface of one of the walls.

3. The module of claim 1, and further comprising a light reflector within the enclosure, for reflecting the light emitted by the light sources toward the panel.

4. An electrical power module, comprising:

a) a light-proof enclosure having generally planar walls;

b) an electrically energizable light source within the enclosure, for emitting light when energized;

c) a photovoltaic panel mounted on an interior surface of one of the walls within the enclosure, for converting the light emitted by the light source to electrical power; and d) an additional photovoltaic panel mounted on an interior surface of another of the walls, for converting the light emitted by the light source to electrical power.

5. The module of claim 4, and further comprising an additional light source within the enclosure, for emitting additional light when energized.

6. The module of claim 4, and further comprising a light reflector within the enclosure, for reflecting the light emitted by the light source toward the panel.

7. An electrical power system, comprising:

a) an electrical power module including a light-proof enclosure, an electrically energizable light source within the enclosure for emitting light when energized, a photovoltaic panel within the enclosure for converting the light emitted by the light source to electrical power, and an additional light source and an additional photovoltaic panel, both mounted within the enclosure; and b) a control circuit for energizing the light sources.

8. The system of claim 7, and further comprising a light reflector mounted within the enclosure.

9. The system of claim 7, wherein the control circuit includes a relay having switched states in which an external power source is operatively connected to, and disconnected from, respectively, the light sources.

10. The system of claim 9, wherein the external power source is a battery for supplying DC voltage, and wherein the control circuit includes an inverter for converting the DC voltage to AC voltage to energize the light sources.

* * * * *